(12) United States Patent
Kataoka et al.

(10) Patent No.: US 10,923,769 B2
(45) Date of Patent: Feb. 16, 2021

(54) ELECTROLYTIC SOLUTION FOR NON-AQUEOUS SECONDARY BATTERY AND NON-AQUEOUS SECONDARY BATTERY

(71) Applicant: FUJIFILM Corporation, Tokyo (JP)

(72) Inventors: Shohei Kataoka, Kanagawa (JP);
Naoya Hatakeyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 16/251,089

(22) Filed: Jan. 18, 2019

(65) Prior Publication Data
US 2019/0157720 A1 May 23, 2019

Related U.S. Application Data

(63) Continuation of application No. PCT/JP2017/026072, filed on Jul. 19, 2017.

(30) Foreign Application Priority Data

Jul. 20, 2016 (JP) ................ 2016-142519

(51) Int. Cl.
*H01M 10/0568* (2010.01)
*H01M 10/0569* (2010.01)
(Continued)

(52) U.S. Cl.
CPC ... *H01M 10/0568* (2013.01); *H01M 10/0567* (2013.01); *H01M 10/0569* (2013.01); *H01M 10/0525* (2013.01); *H01M 2300/0028* (2013.01)

(58) Field of Classification Search
CPC ......... H01M 10/0567; H01M 10/0568; H01M 10/0569; H01M 10/0525
See application file for complete search history.

(56) References Cited

U.S. PATENT DOCUMENTS

| 4,857,423 A | 8/1989 | Abraham et al. |
| 2015/0072225 A1 | 3/2015 | Ishiji et al. |
| 2015/0072246 A1 | 3/2015 | Ishiji et al. |

FOREIGN PATENT DOCUMENTS

| JP | S6286673 | 4/1987 |
| JP | H01206571 | 8/1989 |

(Continued)

OTHER PUBLICATIONS

"International Search Report (Form PCT/ISA/210) of PCT/JP2017/026072," dated Oct. 3, 2017, with English translation thereof, pp. 1-5.

(Continued)

*Primary Examiner* — Osei K Amponsah
(74) *Attorney, Agent, or Firm* — JCIPRNET

(57) ABSTRACT

Provided is an electrolytic solution for a non-aqueous secondary battery containing an electrolyte, an organic solvent, and a compound represented by any of General Formulae (I) to (III) and a non-aqueous secondary battery in which the electrolytic solution for a non-aqueous secondary battery is used.

(I)

(Continued)

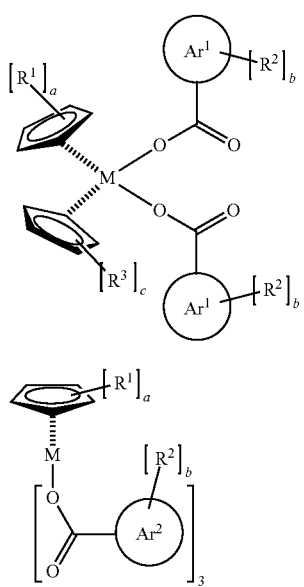

In the formulae, M represents a transition metal.

$R^1$, $R^2$, and $R^3$ represent a specific substituent. a represents an integer of 0 to 5. b represents an integer of 0 or more. c represents an integer of 0 to 5.

$Ar^1$ represents an aromatic ring. In General Formula (II), a plurality of $Ar^1$'s may be linked together.

$Ar^2$ represents a nitrogen-containing aromatic hetero ring.

4 Claims, 4 Drawing Sheets

(51) Int. Cl.
  *H01M 10/0567* (2010.01)
  *H01M 10/0525* (2010.01)

(56) References Cited

FOREIGN PATENT DOCUMENTS

| JP | H0547416 | 2/1993 | | |
|----|----------|--------|---|---|
| JP | 2001155772 | 6/2001 | | |
| JP | 2003115298 | 4/2003 | | |
| JP | 2004063432 | 2/2004 | | |
| JP | 2007265858 | 10/2007 | | |
| JP | 2009238945 | * 10/2009 | ............ | H01M 10/36 |
| JP | 2013242999 | 12/2013 | | |
| JP | 2014029827 | 2/2014 | | |
| WO | 2013172383 | 11/2013 | | |
| WO | 2015016186 | 2/2015 | | |
| WO | 2016027583 | 2/2016 | | |

OTHER PUBLICATIONS

"Written Opinion of the International Searching Authority (Form PCT/ISA/237) of PCT/JP2017/026072," dated Oct. 3, 2017, with English translation thereof, pp. 1-7.

M. Neal Golovin, et al., "Applications of Metallocenes in Rechargeable Lithium Batteries for Overcharge Protection," J. Electrochem. Soc., vol. 139, Jan. 1992, pp. 5-10.

Enqin Fu, et al., "Synthetic and electrochemical studies on electroactive ionophores based on the di-η-cyclopentadienyl-molybendum and -tungsten fragments", Journal of Organometallic Chemistry, vol. 355, Nov. 1988, pp. 205-217.

"Office Action of Japan Counterpart Application", dated Jul. 30, 2019, with English translation thereof, pp. 1-6.

* cited by examiner

ELECTROLYTIC SOLUTION FOR NON-AQUEOUS SECONDARY BATTERY AND NON-AQUEOUS SECONDARY BATTERY

CROSS-REFERENCE TO RELATED APPLICATIONS

This application is a Continuation of PCT International Application No. PCT/JP2017/026072 filed on Jul. 19, 2017, which claims priority under 35 U.S.C. § 119 (a) to Japanese Patent Application No. 2016-142519 filed in Japan on Jul. 20, 2016. Each of the above applications is hereby expressly incorporated by reference, in its entirety, into the present application.

BACKGROUND OF THE INVENTION

1. Field of the Invention

The present invention relates to an electrolytic solution for a non-aqueous secondary battery and a non-aqueous secondary battery.

2. Description of the Related Art

Lithium ion secondary batteries are capable of realizing charging and discharging of a larger energy density compared with secondary batteries of the related art (for example, lead batteries and nickel cadmium batteries). Lithium ion secondary batteries have been broadly applied to portable electronic devices such as mobile phones and notebook computers using the above-described characteristic. Recently, in response to the extension of the applicable use, active research and development has been underway for the improvement of the battery characteristics of lithium ion secondary batteries. Particularly, in response to the development of the use for transportation devices including cars, there has been a demand for additional efforts such as the additional improvement of performance regarding high-speed and large-capacity charging and discharging and safety and countermeasures to an increase in the potential of electrodes.

As one of dominant methods for improving the battery characteristics of lithium ion secondary batteries, a technique of adding an additive to an electrolytic solution has been proposed. For example, the use of a variety of additives for the purpose of improving cycle characteristic which is one of battery characteristics has been reported (refer to JP1987-086673A (JP-S62-086673A), JP2001-155772A, JP2004-063432A, JP2007-265858A, JP1993-047416A (JP-H5-047416A), JP2003-115298A, and JP2014-029827A).

SUMMARY OF THE INVENTION

Hitherto, as a functional additive added to improve the cycle characteristics, organic compounds having a low molecular weight such as benzophenone or succinic acid have been mainly studied (refer to JP1987-086673A (JP-S62-086673A), JP2001-155772A, JP2004-063432A, and JP2007-265858A). Although the action mechanism thereof has not been clarified, it is considered that the organic compounds mainly act on a negative electrode and thus bring about the effect. Meanwhile, JP2014-029827A describes an organic metal compound that acts on a positive electrode instead of a negative electrode.

Recently, non-aqueous secondary batteries that can be driven at a higher potential have been demanded. In order to realize the high-potential driving and enable non-aqueous secondary batteries to satisfy a high level of requirements regarding battery performance such as cycle characteristics, it is necessary to suppress the oxidation and decomposition of an organic solvent or the like that is included in an electrolytic solution on the positive electrode surface during the high-potential driving. As one of means for suppressing the oxidation and decomposition, the formation of a solid electrolyte interphase (SEI) coating on the positive electrode surface at a high potential is considered to be effective.

The organic metal compound described in JP2014-029827A is considered to form an SEI coating on the positive electrode surface (hereinafter, an SEI coating that is formed on the positive electrode active material layer surface will be referred to as the positive electrode SEI coating) during the driving of a non-aqueous secondary battery at approximately 4 V by being added to an electrolytic solution. However, in the case of driving the non-aqueous secondary battery at a higher potential, in the organic metal compound described in JP2014-029827A, it is not possible to form a sufficient positive electrode SEI coating.

In consideration of the above-described circumstance, an object of the present invention is to provide an electrolytic solution for a non-aqueous secondary battery capable of effectively suppressing the oxidation and decomposition of an organic solvent or the like on a positive electrode surface even during the driving of a non-aqueous secondary battery at a higher potential (for example, approximately 5 V). In addition, another object of the present invention is to provide a non-aqueous secondary battery in which the above-described electrolytic solution for a non-aqueous secondary battery is used.

The present inventors repeated intensive studies mainly about compounds for forming a positive electrode SEI coating in order to develop a non-aqueous secondary battery that can be driven at a high potential. As a result, it was found that, in a case in which a compound represented by any of General Formulae (I) to (III) is added to an electrolytic solution in a non-aqueous secondary battery, it is possible to effectively suppress the oxidation and decomposition of an organic solvent or the like included in the electrolytic solution even in the case of driving the non-aqueous secondary battery at a high potential. The present invention was completed on the basis of such a technical finding.

That is, the objects are achieved by the following means.

(1) An electrolytic solution for a non-aqueous secondary battery comprising: an electrolyte; an organic solvent; and a compound represented by any of General Formulae (I) to (III).

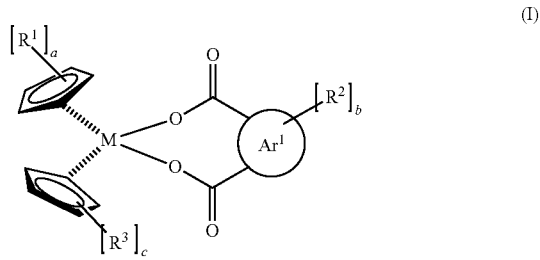

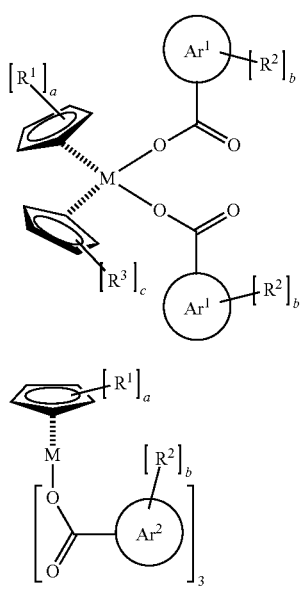

In the formulae, M represents a transition metal.
$R^1$, $R^2$, and $R^3$ each independently represent an alkyl group, an alkylsilyl group, an alkenyl group, an alkynyl group, an alkoxy group, a thioalkoxy group, an amino group, an amide group, an acyloxy group, a cyano group, a carboxy group, a carbonyl group-containing group, a sulfonyl group-containing group, a phosphino group, or a halogen atom. a represents an integer of 0 to 5. b represents an integer of 0 or more. c represents an integer of 0 to 5.
$Ar^1$ represents an aromatic ring. In General Formula (II), a plurality of $Ar^1$'s may be linked together.
$Ar^2$ represents a nitrogen-containing aromatic hetero ring.
(2) The electrolytic solution for a non-aqueous secondary battery according to (1), in which, in General Formulae (I) to (III), M is Ti, Zr, or Hf.
(3) The electrolytic solution for a non-aqueous secondary battery according to (1) or (2), in which a compound having a carbonate group is included as the organic solvent.
(4) A non-aqueous secondary battery comprising: a positive electrode; a negative electrode; and the electrolytic solution for a non-aqueous secondary battery according to any one of (1) to (3).

The electrolytic solution for a non-aqueous secondary battery of the present invention is capable of effectively suppressing the oxidation and decomposition of an organic solvent or the like included in the electrolytic solution on a positive electrode surface even in the case of driving a non-aqueous secondary battery at a high potential by being used as an electrolytic solution for a non-aqueous secondary battery. In addition, the non-aqueous secondary battery of the present invention is capable of effectively suppressing the deterioration of the electrolytic solution on the positive electrode surface even in the case of being driven at a high potential.

The above-described and other characteristics and advantages of the present invention will be further clarified by the following description with appropriate reference to the accompanying drawings.

DESCRIPTION OF THE PREFERRED EMBODIMENTS

[Electrolytic Solution for Non-Aqueous Secondary Battery]

Figure 1:
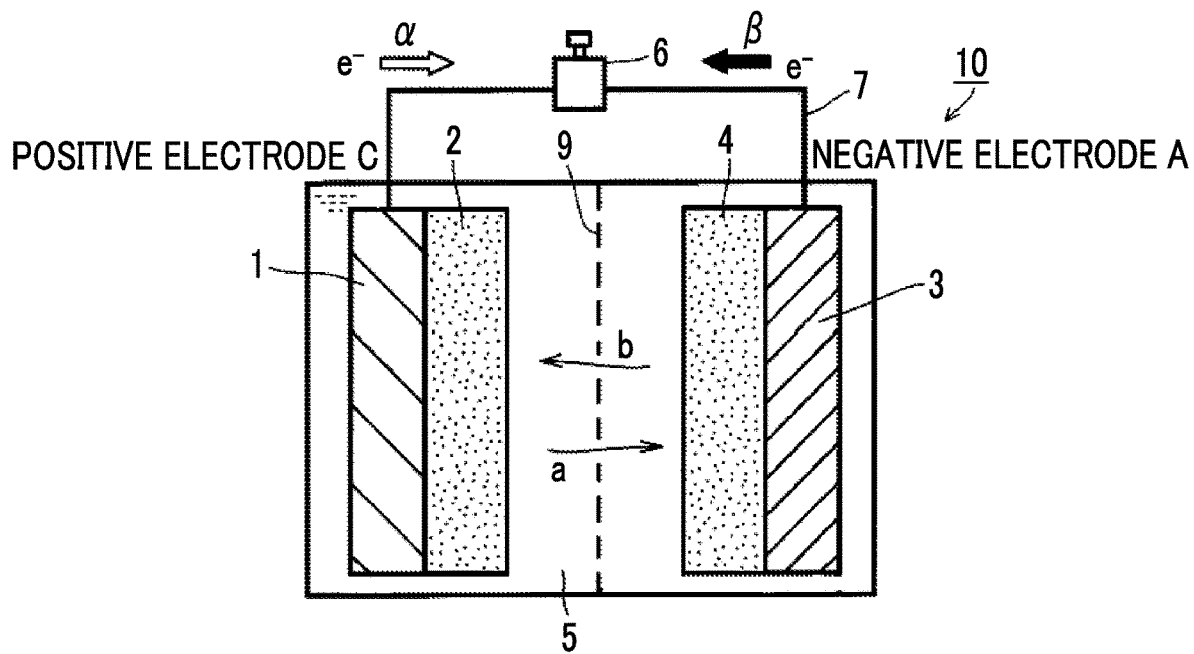
FIG. 1 is a cross-sectional view schematically showing a mechanism of a lithium ion non-aqueous secondary battery according to a preferred embodiment of the present invention.

An electrolytic solution for a non-aqueous secondary battery of the present invention (hereinafter, also referred to as the electrolytic solution) contains an electrolyte, an organic solvent, and a compound represented by any of General Formulae (I) to (III). Hereinafter, a preferred embodiment thereof will be described.

<Compound Represented by any of General Formulae (I) to (III)>

As described above, the electrolytic solution of the present invention contains a compound represented by any of General Formulae (I) to (III). Hereinafter, the compound represented by any of General Formulae (I) to (III) will be referred to as the specific compound in some cases.

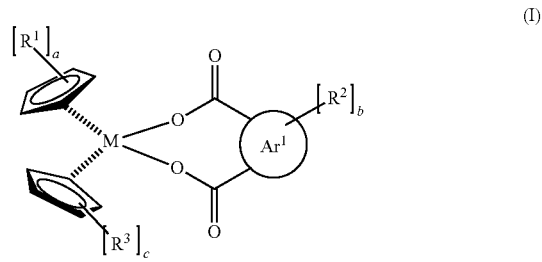

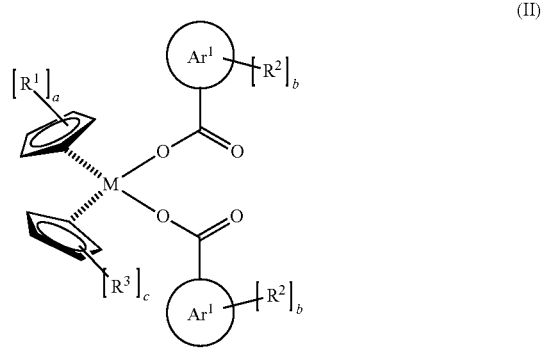

-continued

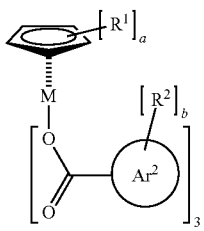
(III)

In General Formulae (I) to (III), M represents a transition metal. An atom of the transition metal is not particularly limited; however, for example, an iron atom (Fe), a titanium atom (Ti), a zirconium atom (Zr), a hafnium atom (Hf), and an yttrium atom (Y) are preferred, and Ti, Zr, and Hf are more preferred since oxidation and reduction derived from a change in the valence of a central metal is not easily caused up to near 5 V.

The valence of M is not particularly limited, but is preferably 2 to 6 and more preferably 3 to 5. Meanwhile, for example, the valence of Ti, Zr, and Hf is generally 4.

$R^1$, $R^2$, and $R^3$ each independently represent an alkyl group (preferably having 1 to 6 carbon atoms and more preferably having 1 to 3 carbon atoms), an alkylsilyl group (preferably having 1 to 6 carbon atoms and more preferably having 1 to 3 carbon atoms), an alkenyl group (preferably having 2 to 6 carbon atoms and more preferably having 2 or 3 carbon atoms), an alkynyl group (preferably having 2 to 6 carbon atoms and more preferably having 2 or 3 carbon atoms), an alkoxy group (preferably having 1 to 6 carbon atoms and more preferably having 1 to 3 carbon atoms), a thioalkoxy group (alkylthio group) (preferably having 1 to 6 carbon atoms and more preferably having 1 to 3 carbon atoms), an amino group (preferably having 0 to 6 carbon atoms and more preferably having 1 to 4 carbon atoms), an amide group (carbamoyl group) (preferably having 1 to 6 carbon atoms and more preferably having 1 to 3 carbon atoms), an acyloxy group (preferably having 1 to 6 carbon atoms and more preferably having 1 to 3 carbon atoms), a cyano group, a carboxy group, a carbonyl group-containing group (Ra—CO—) (preferably having 2 to 7 carbon atoms and more preferably having 2 to 4 carbon atoms), a sulfonyl group-containing group (Ra—$SO_2$—), a phosphino group [—$PR_2$: R represents a hydrogen atom or an alkyl group] (preferably having 0 to 6 carbon atoms and more preferably having 1 to 3 carbon atoms), or a halogen atom (for example, a fluorine atom, a chlorine atom, a bromine atom, or an iodine atom). Meanwhile, Ra represents a hydrogen atom or a substituent, and, as a preferred substituent, examples of a substituent T described below are exemplified.

Among the substituents indicated in $R^1$, $R^2$, and $R^3$, a methyl group, an n-butyl group, a t-butyl group, a trimethylsilyl group, a phosphino group (preferably having 2 to 6 carbon atoms and more preferably having 2 or 3 carbon atoms), an alkylamino group (preferably having 2 to 6 carbon atoms and more preferably having 2 to 4 carbon atoms), and a methoxy group are preferred, and a methyl group and a methoxy group are more preferred.

a represents an integer of 0 to 5. Among these, an integer of 0 to 4 is preferred, 0 or 1 is more preferred, and 0 is particularly preferred.

b represents an integer of 0 or more. Among these, an integer of 0 to 5 is preferred, and an integer of 0 to 2 is more preferred.

c represents an integer of 0 to 5. Among these, an integer of 0 to 4 is preferred, 0 or 1 is more preferred, and 0 is particularly preferred.

In a case in which there is a plurality of R's, $R^2$'s, or $R^3$'s, the plurality of $R^1$'s, $R^2$'s, or $R^3$'s may be identical to or different from each other.

In a case in which there is a plurality of $R^1$'s, $R^1$'s may be bonded or condensed together to form an aliphatic ring or an aromatic ring. In addition, in any case in which the number of $R^1$'s is one or plural, $R^1$ may form a ring together with a ring-constituting atom of cyclopentadienyl.

In a case in which there is a plurality of $R^2$'s, $R^2$'s may be linked together, and $R^2$'s may be bonded or condensed together to form an aliphatic ring or an aromatic ring. In addition, in any case in which the number of $R^2$'s is one or plural, $R^2$ may form a ring together with a ring-constituting atom of $Ar^1$ or $Ar^2$.

In a case in which there is a plurality of $R^3$'s, $R^3$'s may be bonded or condensed together to form an aliphatic ring or an aromatic ring. In addition, in any case in which the number of $R^3$'s is one or plural, $R^3$ may form a ring together with a ring-constituting atom of cyclopentadienyl.

As the aliphatic ring, a cyclopropane ring, a cyclopentane ring, and a cyclohexane ring are exemplified. Meanwhile, as the aromatic ring, a benzene ring, a naphthalene ring, and a pyridine ring are exemplified.

Specific examples of the ring that $R^1$ or $R^3$ forms together with the ring-constituting atom of cyclopentadienyl include a cyclopropane ring, a cyclopentane ring, and a cyclohexane ring.

Specific examples of the ring that $R^2$ forms together with the ring-constituting atom of $Ar^1$ or $Ar^2$ include a naphthalene ring, a benzoxazolium ring, and a benzothiazolium ring.

$R^1$ and $R^3$ may be linked together.

$Ar^1$ represents an aromatic ring. The aromatic ring is preferably an aromatic hydrocarbon ring (preferably having 6 to 20 carbon atoms and more preferably having 6 to 10 carbon atoms) or an aromatic hetero ring (preferably having 2 to 20 carbon atoms and more preferably having 3 to 10 carbon atoms; five- or six-membered ring group having at least one oxygen atom, sulfur atom, or nitrogen atom) and more preferably a nitrogen-containing aromatic hetero ring. Among these, aromatic hydrocarbon rings such as benzene and naphthalene and nitrogen-containing aromatic hetero rings such as pyridine and imidazole are preferred, and benzene or pyridine is more preferred.

In General Formula (II), a plurality of $Ar^1$'s may be linked together. As a linking structure between the plurality of $Ar^1$'s in this case, a single bond, an ether bond (—O—), and alkylene are exemplified.

In a case in which $Ar^1$ includes an atom capable of serving as a ligand atom relative to M as the ring-constituting atom, $Ar^1$ and M may form a coordinate bond.

$Ar^2$ represents a nitrogen-containing aromatic hetero ring (preferably having 2 to 20 carbon atoms and more preferably having 3 to 10 carbon atoms; a five- or six-membered ring group having at least one oxygen atom, sulfur atom, or nitrogen atom), and is preferably pyridine, imidazole, or oxazole.

In a case in which $Ar^2$ includes an atom capable of serving as a ligand atom relative to M as the ring-constituting atom, $Ar^2$ and M may form a coordinate bond.

As the substituent T, the following substituents are exemplified.

The substituent is an alkyl group (preferably an alkyl group having 1 to 20 carbon atoms; for example, methyl, ethyl, isopropyl, t-butyl, pentyl, heptyl, I-ethylpentyl, benzyl, 2-ethoxyethyl, 1-carboxymethyl, or the like), an alkenyl group (preferably an alkenyl group having 2 to 20 carbon atoms, for example, vinyl, allyl, oleyl, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like), an aryl group (preferably an aryl group having 6 to 26 carbon atoms, for example, phenyl, 1-naphthyl, 4-methoxyphenyl, 2-chlorophenyl, 3-methylphenyl, or the like), a heterocyclic group (preferably a heterocyclic group having 2 to 20 carbon atoms, preferably a five- or six-membered heterocyclic group having at least one oxygen atom, sulfur atom, or nitrogen atom, for example, 2-pyridyl, 4-pyridyl, 2-imidazolyl, 2-benzoimidazolyl, 2-thiazolyl, 2-oxazolyl, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like), an alkoxycarbonyl group (preferably an alkoxycarbonyl group having 2 to 20 carbon atoms, for example, ethoxycarbonyl, 2-ethylhexyloxycarbonyl, or the like), an amino group (preferably an amino group having 0 to 20 carbon atoms, an alkylamino group and an arylamino group are included, for example, amino, N,N-dimethylamino, N,N-diethylamino, N-ethylamino, anilino, or the like), a sulfamoyl group (preferably a sulfamoyl group having 0 to 20 carbon atoms, for example, N,N-dimethylsulfamoyl, N-phenylsulfamoyl, or the like), an acyl group (preferably an acyl group having 1 to 20 carbon atoms, for example, acetyl, propionyl, butyryl, benzoyl, or the like), an acyloxy group (preferably an acyloxy group having 1 to 20 carbon atoms, for example, acetyloxy, benzoyloxy, or the like), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), a sulfonamido group (preferably a sulfonamido group having 0 to 20 carbon atoms, for example, methanesulfonamide, benzenesulfonamide, N-methylmethanesulfonamide, N-ethylbenzenesulfonamide, or the like), an alkylthio group (preferably an alkylthio group having 1 to 20 carbon atoms, for example, methylthio, ethylthio, isopropylthio, benzylthio, or the like), an arylthio group (preferably an arylthio group having 6 to 26 carbon atoms, for example, phenylthio, 1-naphthylthio, 3-methylphenylthio, 4-methoxyphenylthio, or the like), an alkyl- or arylsulfonyl group (preferably an alkyl- or arylsulfonyl group having 1 to 20 carbon atoms, for example, methylsulfonyl, ethylsulfonyl, benzenesulfonyl, or the like), a hydroxy group, a cyano group, or a halogen atom (for example, a fluorine atom, a chlorine atom, a bromine atom, an iodine atom, or the like), more preferably an alkyl group, an alkenyl group, an aryl group, a heterocyclic group, an alkoxy group, an aryloxy group, an alkoxycarbonyl group, an amino group, an acylamino group, a hydroxy group, or a halogen atom, and particularly preferably an alkyl group, an alkenyl group, a heterocyclic group, an alkoxy group, an alkoxycarbonyl group, an amino group, an acylamino group, or a hydroxy group.

In addition, the respective groups exemplified as the substituent T may be further substituted with the substituent T.

When a compound, a substituent, or the like includes an alkyl group, an alkenyl group, or the like, the alkyl group, the alkenyl group, or the like may be linear or branched and may be substituted or unsubstituted. In addition, when a compound, a substituent, or the like includes an aryl group, a heterocyclic group, or the like, the aryl group, the heterocyclic group, or the like may be a single ring or a condensed ring and may be substituted or unsubstituted.

Meanwhile, a substance expressed as a compound or a complex in the present specification refers not only to the compound or the complex but also to a salt or an ion thereof. In addition, the substance also refers to a derivative obtained by changing a specific part of the substance as long as a desired effect is not impaired. In addition, a substituent and a linking group that is not expressed as substituted or unsubstituted in the present specification means that the substituent and the linking group may have a random substituent therein. What has been described above also shall apply to a compound that is not expressed as substituted or unsubstituted. As a preferred substituent, the substituent T is exemplified.

Specific examples of the specific compound will be exemplified, but the present invention is not interpreted to be limited thereto.

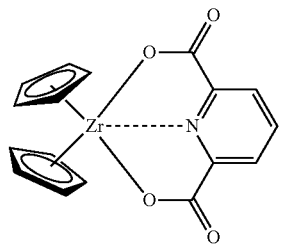

A-1

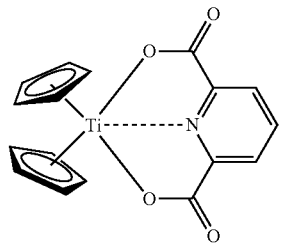

A-2

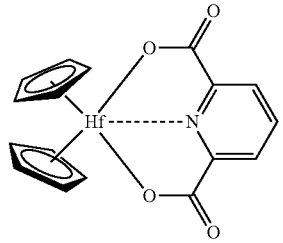

A-3

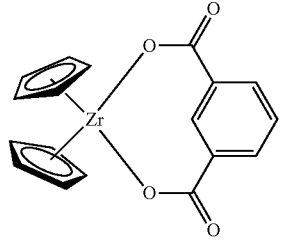

A-4

A-5 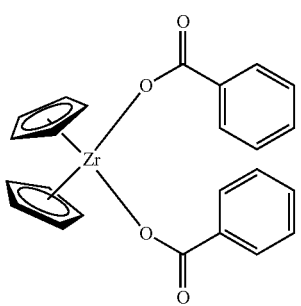

A-6 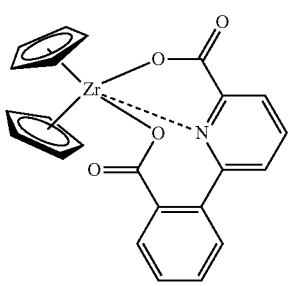

A-7 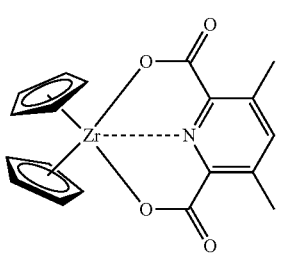

A-8 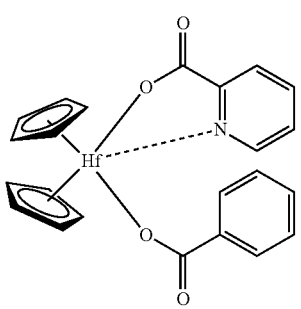

A-9 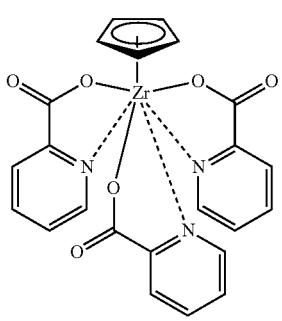

A-10 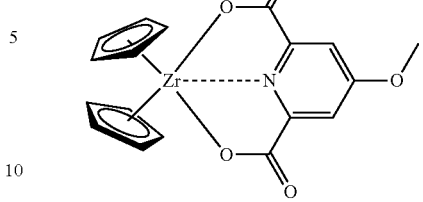

A-11 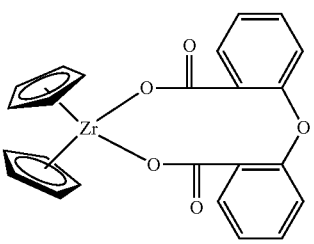

The specific compound that is used in the present invention can be synthesized using an ordinary method.

Meanwhile, the specific compound that is used in the present invention may be used singly or two or more specific compounds may be used in combination.

Here, an assumed action mechanism of the specific compound that suppresses the oxidation and decomposition of components such as the organic solvent included in the electrolytic solution for a non-aqueous secondary battery in a non-aqueous secondary battery of the present invention will be described. Here, the present invention is not interpreted to be limited by the description of the action mechanism.

In the present invention, it is assumed that a decomposition reaction of the specific compound on the positive electrode surface takes part in the suppression of the oxidation and decomposition. Particularly, it is considered that the suppression action becomes significant in a high-potential positive electrode. That is, it is considered that, in the case of driving a non-aqueous secondary battery at a high potential (for example, approximately 5 V), due to oxidation on the positive electrode surface, a certain reaction proceeds, and a protective film (positive electrode SEI coating) including the specific compound as a matrix is formed on the positive electrode surface. As a result, it is assumed that the contact between the positive electrode and the electrolytic solution for a non-aqueous secondary battery is suppressed and the oxidation and decomposition of components such as the organic solvent included in the electrolytic solution is suppressed.

Here, the specific compound that is used in the present invention has a ligand having cyclopentadienyl and a ligand which is bonded with an aromatic ring and has a —C(=O)—O— structure as illustrated in General Formulae (I) to (III). As a result, it is assumed that the specific compound decomposes at a high potential at which a positive electrode active material is capable of intercalating and deintercalating Li ions, and the positive electrode SEI coating is more selectively formed on the positive electrode surface, whereby the oxidation and decomposition of the organic solvent or the like included in the electrolytic solution are more effectively suppressed.

Also depending on the constitution of a secondary battery to which the electrolytic solution of the present invention is applied, generally, the content of the specific compound in the electrolytic solution is preferably approximately 0.01% by mass to 1% by mass and more preferably 0.05% by mass to 0.5% by mass. With respect to 100 parts by mass of the electrolyte as a standard, the content of the specific compound in the electrolytic solution for a non-aqueous secondary battery of the present invention is preferably 0.0005 to 0.05 parts by mass and more preferably 0.0025 to 0.025 parts by mass.

In a case in which the content of the specific compound is in the above-described range, it is possible to efficiently suppress (1) an increase in resistance in the non-aqueous secondary battery and (2) the oxidation of components included in the electrolytic solution for a non-aqueous secondary battery that is included in the non-aqueous secondary battery.

(Electrolyte)

The electrolytic solution of the present invention contains an electrolyte. As the electrolyte, a metal ion or a salt thereof is exemplified, and a metal ion belonging to Group I or II of the periodic table or a salt thereof is preferred. Examples thereof include a lithium salt, a potassium salt, a sodium salt, a calcium salt, a magnesium salt, and the like, and the electrolyte can be appropriately selected depending on the intended use of the electrolytic solution. In a case in which the electrolytic solution is used in a secondary battery or the like, a lithium salt is preferred from the viewpoint of the output.

In a case in which the electrolytic solution of the present invention is used as an electrolytic solution for a lithium ion non-aqueous secondary battery, a lithium salt may be selected as the electrolyte. The lithium salt is not particularly limited as long as the lithium salt is a lithium salt that is ordinarily used as an electrolyte in an electrolytic solution for a lithium ion non-aqueous secondary battery, but lithium salts described below are preferred.

(L-1) Inorganic lithium salts: Inorganic fluoride salts such as $LiPF_6$, $LiBF_4$, $LiAsF_6$, and $LiSbF_6$; perhalogen acid salts such as $LiClO_4$, $LiBrO_4$, and $LiIO_4$; inorganic chloride salts such as $LiAlCl_4$; and the like.

(L-2) Fluorine-containing organic lithium salts: Perfluoroalkanesulfonates such as $LiCF_3SO_3$; perfluoroalkanesulfonylimide salts such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkylfluorophosphates such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and the like.

(L-3) Oxalate borate salts: Lithium bis(oxalate)borate, lithium difluorooxalateborate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)_2$ are preferred, and lithium imide salts such as $LiPF_6$, $LiBF_4$, $LiN(Rf^1SO_2)_2$, $LiN(FSO_2)_2$, and $LiN(Rf^1SO_2)(Rf^2SO_2)_2$ are more preferred. Here, $Rf^1$ and $Rf^2$ each represent a perfluoroalkyl group.

Meanwhile, the electrolyte, for example, the lithium salt, may be used singly or two or more electrolytes may be used in random combination.

The content of the electrolyte in the electrolytic solution is not particularly limited, is appropriately selected depending on the intended use of the electrolytic solution, and is generally 10% by mass or more and 50% by mass or less and more preferably 15% by mass or more and 30% by mass or less in the total mass of the electrolytic solution. Meanwhile, in the case of being evaluated in terms of the concentration of an ion, the content needs to be calculated by the salt conversion with a metal that is preferably applied.

(Organic Solvent)

The organic solvent that is used in the present invention is not particularly limited, but is preferably an aprotic organic solvent, and, in particular, an aprotic organic solvent having 2 to 10 carbon atoms is more preferred. The aprotic organic solvent is preferably a compound having an ether group (—O—), a carbonyl group (—C(=O)—), an ester group (—C(=O)O—), or a carbonate group (—OC(=O)O—), and, a compound having a carbonate group (preferably having 3 to 10 carbon atoms) is preferred since the compound is capable of dissolving the lithium salt that is the electrolyte at a high concentration and is relatively resistant to oxidation and reduction. Meanwhile, in the description of the present invention, the compound having an ester group (—C(=O)O—) is not classified into a compound having an ether group (—O—) or a carbonyl group (—C(=O)—). Meanwhile, in the description of the present invention, the compound having a carbonate (—OC(=O)O—) group is not classified into a compound having an ether group (—O—), a carbonyl group (—C(=O)—), or an ester group (—C(=O)O—).

These compounds may have a substituent, and specific examples of the substituent include the above-described substituent T.

The organic solvent may be used singly or two or more organic solvents may be jointly used.

Examples of the organic solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, ethyl trimethyl acetate, acetonitrile, glutaronitrile, adiponitrile, methoxy acetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, dimethyl sulfoxide phosphoric acid, and the like. Among these, at least one from the group consisting of ethylene carbonate, propylene carbonate, dimethyl carbonate, diethyl carbonate, and ethyl methyl carbonate is preferred, and, particularly, a combination of a high-viscosity (high-permittivity) solvent (for example, specific permittivity ε≥30) such as ethylene carbonate or propylene carbonate and a low-viscosity solvent (for example, the viscosity≤1 mPa·s) such as dimethyl carbonate, ethyl methyl carbonate, or diethyl carbonate is more preferred. This is because the dissociation property of an electrolyte salt and the mobility of an ion improve.

However, the organic solvent that is used in the present invention is not limited by the above-described exemplification.

(Functional Additive)

To the electrolytic solution of the present invention, a variety of functional additives are preferably added. Examples of functions that are developed by these additives include the improvement of flame retardance, the improvement of cycle characteristics, and the improvement of capacity characteristics. Hereinafter, examples of functional additives that are preferably applied to the electrolytic solution of the present invention will be described. Some of the following additives can also be used as the organic solvent, but also can be used as additives with an intention of developing the above-described functions in the present invention.

(A) Aromatic Compound

As an aromatic compound, a biphenyl compound and an alkyl-substituted benzene compound are exemplified. The biphenyl compound has a partial structure in which two benzene rings are bonded together through a single bond, the benzene ring may have a substituent, and preferred substituents are an alkyl group having 1 to 4 carbon atoms (for example, methyl, ethyl, propyl, t-butyl, or the like) and an aryl group having 6 to 10 carbon atoms (for example, phenyl, naphthyl, or the like).

Specific examples of the biphenyl compound include biphenyl, o-terphenyl, m-terphenyl, p-terphenyl, 4-methylbiphenyl, 4-ethylbiphenyl, and 4-tert-butylbiphenyl.

The alkyl-substituted benzene compound is preferably a benzene compound substituted with an alkyl group having 1 to 10 carbon atoms, and specific examples thereof include cyclohexylbenzene, t-amylbenzene, and t-butylbenzene.

(B) Halogen-Containing Compound

A halogen atom that the halogen-containing compound has is preferably a fluorine atom, a chlorine atom, or a bromine atom and more preferably a fluorine atom. The number of halogen atoms in one molecule is preferably one to six and more preferably one to three. The halogen-containing compound is preferably a carbonate compound substituted with a fluorine atom, a polyether compound having a fluorine atom, or a fluorine-substituted aromatic compound.

The halogen-containing compound is preferably a halogen-substituted carbonate compound, and the halogen-substituted carbonate compound may have any of a chain shape or a cyclic shape; however, from the viewpoint of the ion conductivity, a cyclic carbonate compound having a high coordinating property of a metal ion (for example, a lithium ion) of the electrolyte is preferred, and a five-membered cyclic carbonate compound is particularly preferred.

Specific preferred examples of the halogen-substituted carbonate compound will be shown below. Among them, compounds of Bex to Bex4 are particularly preferred, and Bex1 is particularly preferred.

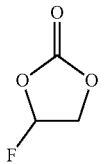

Bex1

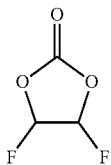

Bex2

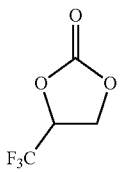

Bex3

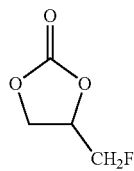

Bex4

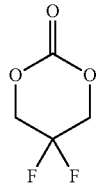

Bex5

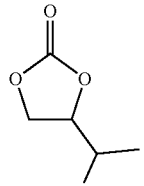

Bex6

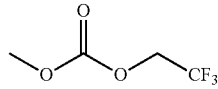

Bex7

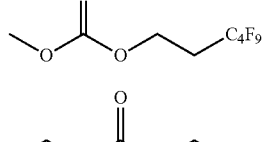

Bex8

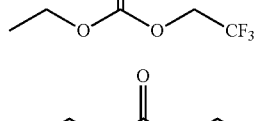

Bex9

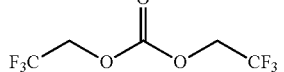

Bex10

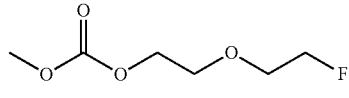

Bex11

Bex12

(C) Polymerizable Compound

As a polymerizable compound, a compound having a carbon-carbon double bond is preferred, a carbonate compound having a double bond such as vinylene carbonate or vinyl ethylene carbonate, a compound having a group selected from an acrylate group, a methacrylate group, a cyanoacrylate group, and an αCF$_3$ acrylate group, and a compound having a styryl group are preferred, and a carbonate compound having a double bond and a compound having two or more polymerizable groups in the molecule are more preferred.

(D) Phosphorus-Containing Compound

As a phosphorus-containing compound, a phosphoric acid ester compound and a phosphazene compound are preferred. Preferred examples of the phosphoric acid ester compound include trimethyl phosphate, triethyl phosphate, triphenyl phosphate, tribenzyl phosphate, and the like. The phosphorus-containing compound is also preferably a compound represented by Formula (D2) or (D3).

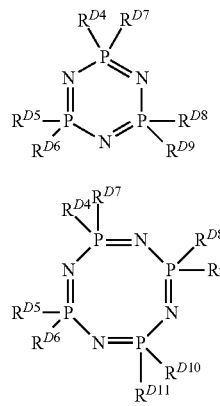

In the formulae, $R^{D4}$ to $R^{D11}$ represent a monovalent substituent. The monovalent substituent is preferably an alkyl group, an aryl group, an alkoxy group, an aryloxy group, an amino group, or a halogen atom (for example, a fluorine atom, a chlorine atom, a bromine atom, or the like). At least one of the substituents of $R^{D4}$ to $R^{D11}$ is preferably a fluorine atom, and the other groups are more preferably a substituent selected from an alkoxy group, an amino group, and a fluorine atom.

(E) Sulfur-Containing Compound

As a sulfur-containing compound, a compound having a —$SO_2$—, —$SO_3$—, or —OS(=O)O— bond is preferred, and cyclic sulfur-containing compounds such as propane sultone, propene sultone, and ethylene sulfite and sulfonic acid esters are preferred.

As the cyclic sulfur-containing compound, a compound represented by Formula (E1) or (E2) is preferred.

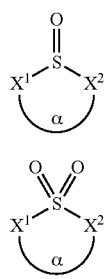

In the formulae, $X^1$ and $X^2$ each independently represent —O— or —C(Ra1)(Rb1)-. Here, Ra1 and Rb1 each independently represent a hydrogen atom or a substituent. The substituent is preferably an alkyl group having 1 to 8 carbon atoms, a fluorine atom, or an aryl group having 6 to 12 carbon atoms. α represents an atomic group necessary to form a five- or six-membered ring. The skeleton of α may include a sulfur atom, an oxygen atom, or the like in addition to a carbon atom. α may be substituted, examples of a substituent include the substituent T, and the substituent is preferably an alkyl group, a fluorine atom, or an aryl group.

Specific examples of the compound represented by Formula (E1) or (E2) will be shown below.

Eex1 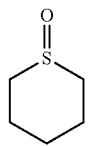

Eex2 

Eex3 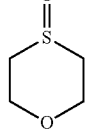

Eex4 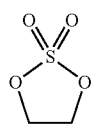

Eex5 

Eex6 

Eex7 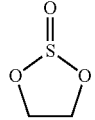

Eex8 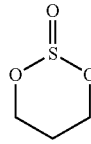

Eex9 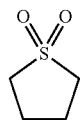

Eex10 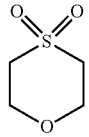

Eex11 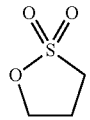

-continued

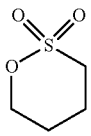

Eex12

(F) Silicon-Containing Compound

As a silicon-containing compound, a compound represented by Formula (F1) or (F2) is preferred.

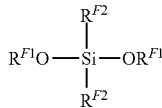

(F1)

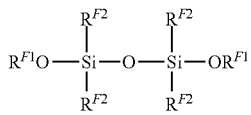

(F2)

$R^{F1}$ represents an alkyl group, an alkenyl group, an acyl group, an acyloxy group, or an alkoxycarbonyl group.

$R^{F2}$ represents an alkyl group, an alkenyl group, an alkynyl group, or an alkoxy group.

Meanwhile, a plurality of $R^{F1}$'s or $R^{F2}$'s in one formula may be different from or identical to each other.

(G) Nitrile Compound

As a nitrile compound, a compound represented by Formula (G) is preferred.

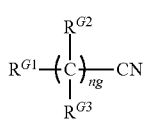

(G)

In the formula, $R^{G1}$ to $R^{G3}$ each independently represent a hydrogen atom, an alkyl group, an alkoxycarbonyl group, an aryloxycarbonyl group, a cyano group, a carbamoyl group, a sulfonyl group, or a phosphonyl group. Regarding preferred examples of the respective substituents, the examples of the above-described substituent T can be referred to, and, among them, a compound having a plurality of nitrile groups in which any one or more of $R^{G1}$ to $R^{G3}$ include a cyano group is preferred. ng represents an integer of 1 to 8.

Specific examples of the compound represented by Formula (G) include acetonitrile, propionitrile, isobutyronitrile, succinonitrile, malononitrile, glutaronitrile, adiponitrile, 2-methylglutaronitrile, hexanetricarbonitrile, propane tetracarbonitrile, and the like. Preferred are succinonitrile, malononitrile, glutaronitrile, adiponitrile, 2-methylglutaronitrile, hexanetricarbonitrile, and propane tetracarbonitrile.

(H) Imide Compound

As an imide compound, from the viewpoint of oxidation resistance, an imide compound in which hydrogen atoms on carbon atoms are all fluorinated is preferred, a perfluorinated sulfone imide compound is preferred, and, specifically, a perfluorinated sulfonimide lithium compound is exemplified.

As the imide compound, specifically, the following structure is exemplified, and Cex1 and Cex2 are more preferred.

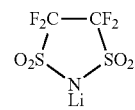

Cex1

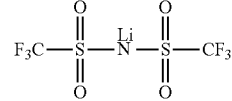

Cex2

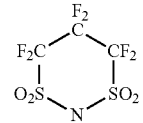

Cex3

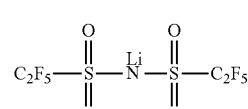

Cex4

The electrolytic solution of the embodiment of the present invention may contain at least one selected from the above-described (A) to (H), a negative electrode coating-forming agent, a flame retardant, an overcharge inhibitor, or the like. The content of each of these functional additives in the electrolytic solution is not particularly limited, but is preferably 0.001% by mass to 10% by mass with respect to the total mass of the electrolytic solution. Due to the addition of these compounds, it is possible to effectively suppress the breakage and/or ignition of a battery during abnormality caused by overcharge or improve the capacity retention characteristics after storage at a high temperature and/or the cycle characteristics.

[Method for Preparing Electrolytic Solution and the Like]

The electrolytic solution for a non-aqueous secondary battery of the present invention is prepared using an ordinary method by dissolving the respective components described above, including an example in which a lithium salt is used as the salt of a metal ion, in the above-described organic solvent.

In the present invention, the expression "non-aqueous" in the electrolytic solution for a non-aqueous secondary battery means that the electrolytic solution substantially does not include water, and the electrolytic solution may include a small amount of water as long as the effect of the present invention is not impaired. From the viewpoint of not impairing the effect of the present invention, the content of water is preferably 200 ppm (mass-based) or less and more preferably 100 ppm or less. There is no particular lower limit value; however, when the inevitable mixing of water is taken into account, the lower limit value is realistically 10 ppm or more.

The viscosity of the electrolytic solution of the present invention is not particularly limited, but is preferably 0.1 to 10 mPa·s and more preferably 0.5 to 5 mPa·s at 25° C.

In the present invention, unless particularly otherwise described, a value measured using the following measurement method is used as the viscosity of the electrolytic solution.

—Method for Measuring Viscosity—

The electrolytic solution (1 mL) was put into a rheometer (CLS 500), and the viscosity is measured using a Steel Cone (both are trade names, manufactured by TA Instruments) having a diameter of 4 cm/2°. The sample is kept warm in advance at a measurement-start temperature until the temperature becomes constant, and then the measurement begins. The measurement temperature is set to 25° C.

(Kit)

The electrolytic solution of the present invention may have a form of a kit constituted of a plurality of liquids, powders, or the like. For example, the electrolytic solution may have a form in which a first agent (first liquid) is made up of the electrolyte and the organic solvent, a second agent (second liquid) is made up of the specific compound and the organic solvent, and the two liquids are mixed together before the use, thereby preparing a liquid. At this time, in the kit of the present invention, other additives and the like may be added to the first agent, the second agent, and/or other agents (third agent). Meanwhile, the contents of the respective components are preferably in the above-described ranges after being mixed together.

[Non-Aqueous Secondary Battery]

A non-aqueous secondary battery contains a positive electrode, a negative electrode, and the electrolytic solution. One example of a preferred embodiment of the non-aqueous secondary battery will be described with reference to FIG. 1 schematically showing a mechanism of a lithium ion non-aqueous secondary battery. Here, the present invention is not interpreted to be limited by the drawing and description based on the drawing.

A lithium ion non-aqueous secondary battery 10 includes the electrolytic solution for a non-aqueous secondary battery 5 of the present invention, a positive electrode C capable of intercalating and deintercalating lithium ions (a positive electrode collector 1, a positive electrode active material layer 2), and a negative electrode A capable of intercalating, deintercalating, dissolving, or precipitating lithium ions (a negative electrode collector 3, a negative electrode active material layer 4). The lithium ion non-aqueous secondary battery may be constituted by including, in addition to the above-described members, a separator 9, a collection terminal (not shown), an exterior case, or the like (not shown) disposed between the positive electrode and the negative electrode in consideration of the intended use of the non-aqueous secondary battery, the shape of a potential, or the like. If necessary, a protective element may be mounted in at least any of the inside or the outside of the non-aqueous secondary battery. In the case of providing the above-described structure, the trade a and b of lithium ions occurs in the electrolytic solution 5, charge ca and discharge (3 can be carried out, and it is possible to carry out the operation or electricity storage of an operation mechanism 6 through a circuit wire 7.

(Battery Shape)

The battery shape of the non-aqueous secondary battery is not particularly limited, examples thereof include a bottomed tubular shape, a bottomed square shape, a thin shape, a sheet shape, a paper shape, and the like, and the battery shape may be any of the above-described shapes. In addition, the battery shape of the non-aqueous secondary battery may be an abnormal shape such as a horseshoe shape or a comb-like shape in consideration of the form of a system and/or a device into which the non-aqueous secondary battery is combined. Among these, from the viewpoint of efficiently discharging heat in the non-aqueous secondary battery to the outside, a bottomed square shape having at least one surface that is relatively flat and has a large area or a square shape such as a thin shape is preferred.

In the case of a battery having a bottomed tubular shape, the outer surface area thereof relative to a power generation element into which the battery is loaded decreases, and thus it is preferable to provide a design in which Joule heat generated by an internal resistance during charge and discharge efficiently escapes to the outside. In addition, it is preferable to provide a design in which the loading ratio of a substance having a high thermal conduction property is increased and a temperature distribution in the battery becomes small. A secondary battery having a bottomed tubular shape will be described below together with FIG. 2.

(Members Constituting Battery)

The non-aqueous secondary battery of the present invention includes the electrolytic solution of the present invention, a positive electrode, and a negative electrode and may be constituted by further including a separator. Hereinafter, the respective members will be described.

(Positive Electrode and Negative Electrode)

The positive electrode and the negative electrode are members obtained by applying a dispersion (mixture) for constituting an active material layer including an active material, a conductive auxiliary agent, a binding agent, a filler, or the like onto a collector (electrode base material) and shaping the dispersion and the collector to a sheet shape. In the non-aqueous secondary battery, generally, a positive electrode mixture in which the active material is a positive electrode active material and a negative electrode mixture in which the active material is a negative electrode active material are used. Next, the respective components and the like in the dispersion (mixture) for constituting the active material layer will be described.

Positive Electrode Active Material

As the positive electrode active material, a transition metal oxide is preferably used, and, particularly, the transition metal oxide having a transition element $M^a$ (one or more elements selected from Co, Ni, Fe, Mn, Cu, and V) is preferred. In addition, the transition metal oxide may have a mixing element $M^b$ (metal other than lithium, an element of Group I (Ia) or Group II (IIa) of the periodic table, Al, Ga, In, Ge, Sn, Pb, Sb, Bi, Si, P, B, or the like) mixed therein. Examples of the above-described transition metal oxide include specific transition metal oxides represented by any of General Formulae (MA) to (MC) and, as other transition metal oxides, $V_2O_5$, $MnO_2$, and the like. As the positive electrode active material, a particulate positive electrode active material may also be used. Specifically, a transition metal oxide capable of reversibly intercalating and deintercalating lithium ions can be used, but the above-described specific transition metal oxide is preferably used.

As the transition metal oxide, an oxide including the above-described transition element $M^a$ and the like are preferably exemplified. At this time, the oxide and the like may have the mixing element $M^b$ (preferably Al) or the like mixed therein. The amount of the mixing element $M^b$ mixed is preferably 0 to 30 mol % of the amount of the transition element. In addition, a transition metal oxide synthesized by mixing lithium and the transition element so that the molar ratio of $Li/M^a$ reaches 0.3 to 2.2 is more preferred.

[Transition Metal Oxide Represented by General Formula (MA) (Bedded Salt-Type Structure)]

As the transition metal oxide, particularly, a transition metal oxide represented by the following general formula is preferred.

$$Li_{aa}M^1O_{bb} \qquad \text{General Formula (MA)}$$

In General Formula (MA), $M^1$ is the same as the $M^a$, and a preferred range thereof is also identical. aa represents 0 to 1.2 and is preferably 0.1 to 1.15 and more preferably 0.6 to 1.1. bb represents 1 to 3 and is preferably 2. Some of $M^1$'s may be substituted with the mixing element $M^b$. Meanwhile, the transition metal oxide represented by General Formula (MA) typically has a bedded salt-type structure.

The present transition metal oxide is more preferably a compound represented by each of the following general formulae.

$Li_gCoO_k$ General Formula (MA-1)

$Li_gNiO_k$ General Formula (MA-2)

$Li_gMnO_k$ General Formula (MA-3)

$Li_gCo_jNi_{1-j}O_k$ General Formula (MA-4)

$Li_gNi_jMn_{1-j}O_k$ General Formula (MA-5)

$Li_gCo_jNi_iAl_{1-j-i}O_k$ General Formula (MA-6)

$Li_gCo_jNi_iMn_{1-j-i}O_k$ General Formula (MA-7)

In General Formulae (MA-1) to (MA-7), g is the same as the aa, and a preferred range thereof is also identical. j represents 0.1 to 0.9. i represents 0 to 1. Here, 1–j–i reaches 0 or more. k is the same as the bb, and a preferred range thereof is also identical.

Specific examples of the transition metal oxide represented by any of General Formulae (MA-1) to (MA-7) include $LiCoO_2$ (lithium cobalt oxide [LCO]), $LiNi_2O_2$ (lithium nickelate), $LiNi_{0.8}Co_{0.01}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Although partially overlapped, in the case of expressing the transition metal oxide represented by General Formula (MA) in a different manner, a compound represented as described below is also exemplified as a preferred example.

$Li_gNi_xMn_yCo_zO_2$ $(x>0.2, y>0.2, z\le 0, x+y+z=1)$ (i)

Representative Compounds:

$Li_gNi_{1/3}Mn_{1/3}Co_{1/3}O_2$ $Li_gNi_{1/2}Mn_{1/2}O_2$ $Li_gNi_xCo_yAl_zO_2(x>0.7, y>0.1, 0.1>z\ge 0.05, x+y+z=1)$ (ii)

Representative Compounds:

$Li_gNi_{0.8}Co_{0.15}Al_{0.05}O_2$

In addition, recently, as an active material that can be used at a high potential, a solid solution represented by Formula (MA-8) has been also preferred.

$LiM^1O_2$—$Li_2MnO_3$ solid solution Formula (MA-8)

In Formula (MA-8), $M^1$ is the same as $M^1$ in General Formula (MA).

[Transition Metal Oxide Represented by General Formula (MB) (Spinel-Type Structure)]

As the transition metal oxide, particularly, a compound represented by General Formula (MB) is also preferred.

$Li_cM^2{}_2O_d$ General Formula (MB)

In General Formula (MB), $M^2$ is the same as the $M^a$, and a preferred range thereof is also identical. c represents 0 to 2 and is preferably 0.1 to 1.5 and more preferably 0.6 to 1.15. d represents 3 to 5 and is preferably 4.

The transition metal oxide represented by General Formula (MB) is more preferably a compound represented by each of the following general formulae.

$Li_{mm}Mn_2O_{nn}$ General Formula (MB-1)

$Li_{mm}Mn_pAl_{2-p}O_{nn}$ General Formula (MB-2)

$Li_{mm}Mn_pNi_{2-p}O_{nn}$ General Formula (MB-3)

In General Formulae (MB-1) to (MB-3), mm is the same as c, and a preferred range thereof is also identical. nn is the same as d, and a preferred range thereof is also identical. p represents 0 to 2. Specific examples of the above-described transition metal oxide include $LiMn_2O_4$ and $LiMn_{1.5}Ni_{0.5}O_4$.

As a preferred example of the transition metal oxide represented by General Formula (MB), furthermore, a compound represented as described below is also exemplified.

$LiCoMnO_4$ General Formula (αa)

$Li_2FeMn_3O_8$ General Formula (αb)

$Li_2CuMn_3O_8$ General Formula (αc)

$Li_2CrMn_3O_8$ General Formula (αd)

$Li_2NiMn_3O_8$ General Formula (αe)

From the viewpoint of a high capacity and a high output, among the above-described compounds, the electrodes including Ni are still more preferred.

[Transition Metal Oxide Represented by General Formula (MC)]

As the transition metal oxide, a transition metal phosphorus oxide is also preferably used, and, particularly, a transition metal phosphorus oxide represented by General Formula (MC) is also preferred.

$Li_eM^3(PO_4)_f$ General Formula (MC)

In General Formula (MC), e represents 0 to 2 and is preferably 0.1 to 1.5 and more preferably 0.5 to 1.15. f represents 1 to 5 and is preferably 0.5 to 2.

$M^3$ represents one or more elements selected from V, Ti, Cr, Mn, Fe, Co, Ni, and Cu. $M^3$ may be substituted with, in addition to the mixing element $M^b$, other metal such as Ti, Cr, Zn, Zr, or Nb. Specific examples thereof include olivine-type iron phosphate salts such as $LiFePO_4$ and $Li_3Fe_2(PO_4)_3$, iron pyrophosphates such as $LiFeP_2O_7$, cobalt phosphate compounds such as $LiCoPO_4$, and monoclinic nasicon-type vanadium phosphate salt such as $Li_3V_2(PO_4)_3$ (lithium vanadium phosphate).

Meanwhile, the aa, c, g, mm, and e values indicating the composition of Li are values that change by charge and discharge and are, typically, evaluated with a value in a stable state in a case in which the transition metal oxide contains Li. Meanwhile, in General Formulae (αa) to (αe), the composition of Li is indicated by a specific value, but this value also, similarly, changes by the operation of the battery.

As the positive electrode active material, among these, spinel-type lithium nickel manganate, olivine-type cobalt phosphate, or the solid solution represented by Formula (MA-8) is particularly preferred, and specific examples thereof include compounds described below.

$LiNi_{0.5}Mn_{1.5}O_4$ $LiCoPO_4$ $Li_2MnO_3$—$LiNi_{0.5}Mn_{0.5}O_2$ solid solution These compounds can be used at a high potential and are thus capable of increasing the battery capacity or have a high capacity retention even in the case of being used at a high potential, which is particularly preferred.

As the positive electrode active material in the present invention, a positive electrode active material having a charge region in which the specific compound can be oxidized is preferably used. Specifically, a material the ordinary use of which can be maintained at a positive electrode potential (Li/Li$^+$-based) of 3.5 V or higher is preferably used. This positive electrode potential is more preferably 3.8 V or higher, still more preferably 3.9 V or higher, and particularly preferably 4.2 V or higher. This positive electrode potential is, particularly, preferably 4.5 V or higher. The upper limit is not particularly limited. However, the upper limit is realistically 5.2 V or lower. In the case of setting the positive electrode potential in the above-described range, it is possible to improve the cycle characteristics and the high-rate discharge characteristics.

Here, the expression "the ordinary use can be maintained" means that there is no case in which an electrode material deteriorates and becomes unusable even in the case of being charged at the voltage, and this potential is also referred to as the ordinary use-possible potential.

The positive electrode potential (Li/Li$^+$-based) during charge and discharge is expressed by the following expression.

(Positive electrode potential)=(negative electrode potential)+(battery voltage)

In a case in which lithium titanate is used as a negative electrode, the negative electrode potential is set to 1.55 V. In a case in which graphite is used as the negative electrode, the negative electrode potential is set to 0.1 V. The battery voltage is observed during charge, and the positive potential is computed.

The electrolytic solution of the present invention is particularly preferably used in combination with a high-potential positive electrode. The use of a high-potential positive electrode, generally, tends to significantly oxidize and deteriorate an electrolytic solution in a non-aqueous secondary battery and degrade the cycle characteristics, but the electrolytic solution of the present invention is capable of suppressing the degradation and maintaining favorable performance.

Therefore, the non-aqueous secondary battery of the present invention can be preferably used in the use of high-potential driving, and, for example, a non-aqueous secondary battery having a driving potential of 4.6 V or higher can be preferably exemplified. The upper limit is not particularly limited, but the upper limit of a realistic driving potential is 5.2 V or lower.

Here, the driving potential refers to the upper limit of the set potential during charging.

The average particle size of the positive electrode active material is not particularly limited, but is preferably 0.1 μm to 50 μm. The specific surface area is not particularly limited, but is preferably 0.01 m$^2$/g to 50 m$^2$/g in terms of a Brunauer-Emmett-Teller (BET) method. In addition, the pH of a supernatant at the time of dissolving the positive electrode active material (5 g) in distilled water (100 ml) is preferably 7 or more and 12 or less.

In order to provide a predetermined particle size to the positive electrode active material, an ordinary crusher or classifier is used. For example, a mortar, a ball mill, an oscillatory ball mill, an oscillatory mill, a satellite ball mill, a planetary ball mill, a swirling airflow-type jet mill, a sieve, or the like is used. A positive electrode active material obtained using a firing method may be used after being washed with water, an acidic aqueous solution, an alkaline aqueous solution, or an organic solvent.

The content of the positive electrode active material is not particularly limited, but is preferably 60% to 98% by mass and more preferably 70% to 95% by mass with respect to 100% by mass of the solid component in the dispersion (mixture) for constituting the positive electrode active material layer.

Negative Electrode Active Material

The negative electrode active material is not particularly limited as long as the negative electrode active material is capable of reversibly intercalating and deintercalating lithium ions, and examples thereof include carbonaceous materials, metal oxides such as tin oxide and silicon oxide, metal complex oxides, a lithium single body, lithium alloys such as lithium aluminum alloys, metals capable of forming an alloy with lithium such as Sn and Si, and the like.

The negative electrode active material may be used singly or two or more negative electrode active materials may be used in a random combination and ratio. Among these, carbonaceous materials or lithium complex oxides are preferably used from the viewpoint of the safety.

In addition, the metal complex oxide is not particularly limited as long as the metal complex oxide is capable of absorbing and emitting lithium, but preferably contains titanium and/or lithium as constituent components from the viewpoint of high-current density charge and discharge characteristics.

The carbonaceous material that is used as the negative electrode active material is a material substantially made of a carbon atom. Here, the expression "material substantially made of a carbon atom" means that the material may include other atoms as long as the effect of the present invention is not impaired, and the content of the other atoms is preferably 0.1 mol % (based on the substance amount) or less and more preferably 0.01 mol % or less. There is no particular lower limit value, but the lower limit value is realistically 0.0001 mol % or more. Examples of the material substantially made of a carbon atom include petroleum pitch, natural graphite, artificial graphite such as highly oriented pyrolytic graphite, and carbonaceous materials obtained by firing a variety of synthetic resins such as polyacrylonitrile (PAN)-based resins and furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The non-aqueous secondary battery needs to include at least one of the metal oxides or the metal complex oxides that are used as the negative electrode active material. As the metal oxides and the metal complex oxides, particularly, amorphous oxides are preferred, and furthermore, chalcogenides that are reaction products between a metal element and an element belonging to Group XVI of the periodic table are also preferably used. The amorphous oxides mentioned herein refer to oxides having a broad scattering band having a peak of a 2θ value in a range of 20° to 40θ in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group made up of the amorphous oxides and the chalcogenides, amorphous oxides of semimetal elements and chalcogenides are more preferred, and elements belonging to Groups XIII (IIIB) to XV (VB) of the periodic table, oxides made of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, $SnSiS_3$, and the like. In addition, these amorphous oxides may be a complex oxide with lithium oxide (for example, $Li_2SnO_2$).

In the non-aqueous secondary battery, the average particle size of the negative electrode active material being used is preferably 0.1 μm to 60 μm. In order to provide a predetermined particle size, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is caused to coexist as necessary. In order to provide a desired particle diameter, classification is preferably carried out. The classification method is not particularly limited, and it is possible to use a sieve, a wind powder classifier, or the like depending on the necessity. Both of dry-type classification and wet-type classification can be carried out.

The chemical formula of a compound obtained using the above-described firing method can be computed by inductively coupled plasma (ICP) emission spectroscopy as a measurement method or from the mass difference of powder before and after firing as a convenient method.

As a negative electrode active material that can be jointly used with an amorphous oxide negative electrode active material mainly containing Sn, Si, and/or Ge, carbonaceous materials capable of absorbing and emitting lithium ions or metallic lithium, lithium, lithium alloys, and metals capable of forming an alloy with lithium are preferably exemplified.

In the present invention, lithium titanate, more specifically, a complex oxide ($Li[Li_{1/3}Ti_{5/3}]O_4$) of lithium and titanium is also preferably used as an active material of the negative electrode.

The amount of the negative electrode active material blended into the dispersion (mixture) for constituting the negative electrode active material layer is not particularly limited, but is preferably 60% to 98% by mass and more preferably 70% to 95% by mass with respect to 100% by mass of the solid component.

Conductive Auxiliary Agent

In a constituted secondary battery, any conductive auxiliary agent may be used as long as the conductive auxiliary agent is an electron conductive material, and an ordinary conductive auxiliary agent can be randomly used. Generally, it is possible to add one or a mixture of conductive materials such as natural graphite (scaly graphite, scale-like graphite, earthy graphite, or the like), artificial graphite, carbon black, acetylene black, Ketjen black, carbon fibers), metal powder (copper, nickel, aluminum, silver, or the like), metal fibers, or polyphenylene derivatives (described in JP1984-020971A (JP-S59-020971A)). Among these, the joint use of graphite and acetylene black is particularly preferred.

The amount of the conductive auxiliary agent added is preferably 0.1% to 50% by mass and more preferably 0.5% to 30% by mass with respect to 100% by mass of the solid component in the dispersion (mixture) for constituting the active material layer. In the case of carbon black and graphite, the amount thereof is particularly preferably 0.5% to 15% by mass in the dispersion.

Binding Agent

As the binding agent, polysaccharides, thermoplastic resins, polymers having rubber elasticity, and the like are exemplified. Among these, for example, an emulsion (latex) or a dispersion of starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinyl pyrrolidone, polyacrylonitrile, polyacrylamide, polyhydroxy (meth)acrylate, a water-soluble polymer such as a styrene-maleic acid copolymer, polyvinyl chloride, polytetrafluoroethylene, polyvinylidene fluoride, a tetrafluoroethylene-hexafluoropropylene copolymer, a vinylidene fluoride-tetrafluoroethylene-hexafluoropropylene copolymer, polyethylene, polypropylene, ethylene-propylene-diene copolymer (EPDM), sulfonated EPDM, a polyvinyl acetal resin, methyl methacrylate, a (meth)acrylic acid ester copolymer containing a (meth)acrylic acid ester such as 2-ethylhexyl acrylate, a (meth)acrylic acid ester-acrylonitrile copolymer, a polyvinyl ester copolymer containing a vinyl ester such as vinyl acetate, a styrene-butadiene copolymer, an acrylonitrile-butadiene copolymer, polybutadiene, neoprene rubber, fluorine rubber, polyethylene oxide, a polyester polyurethane resin, a polyether polyurethane resin, a polycarbonate polyurethane resin, a polyester resin, a phenyl resin, an epoxy resin, or the like is preferred, and a polyacrylic acid ester-based latex, carboxymethyl cellulose, polytetrafluoroethylene, and polyvinylidene fluoride are more preferred.

The binding agent can be used singly or two or more binding agents can be jointly used.

The amount of the binding agent added is preferably 1% to 30% by mass and more preferably 2% to 10% by mass with respect to 100% by mass of the solid component in the dispersion (mixture) for constituting the active material layer. In the case of setting the amount in the above-described range, it is possible to more appropriately maintain the holding force and agglomeration force of the respective components in the dispersion while suppressing a decrease in the electrode unit volume or the capacity per unit mass caused by an increase in the electrode volume.

Filler

As a material that forms the filler, any material can be used as long as the material is a fibrous material. Generally, polypropylene, an olefin-based polymer such as polyethylene, glass, or a fibrous filler made of a material such as carbon is used. The amount of the filler added is not particularly limited, but is preferably 0% to 30% by mass with respect to 100% by mass of the solid component in the dispersion (mixture) for constituting the active material layer.

Collector

As collectors for the positive electrode and the negative electrode, an electron conductor is used. The collector for the positive electrode is preferably aluminum, stainless steel, nickel, titanium, or, additionally, a collector obtained by treating the surface of aluminum or stainless steel with carbon, nickel, titanium, or silver, and, among these, aluminum or an aluminum alloy is more preferred. The collector for the negative electrode is preferably aluminum, copper, stainless steel, nickel, or titanium and more preferably aluminum, copper, or a copper alloy.

Regarding the shape of the collector, generally, a collector having a film sheet-like shape is used, and it is also possible to use a net-shaped collector, a punched collector, a compact of a lathe body, a porous body, a foaming body, or a fiber group, and the like. The thickness of the collector is not particularly limited, but is preferably 1 µm to 500 µm. In addition, the surface of the collector is preferably provided with protrusions and recesses by means of a surface treatment.

Using members appropriately selected from the above-described materials, the electrode mixture of the lithium ion non-aqueous secondary battery is formed.

(Separator)

A separator that can be used in the present invention is not particularly limited as long as the separator is a material having a mechanical strength that electronically insulates the positive electrode and the negative electrode, an ion-transmitting property, and the resistance to the oxidation and/or reduction of a contact surface between the positive electrode and the negative electrode. As the above-described material, a porous polymer material, an inorganic material, an organic/inorganic hybrid material, a glass fiber, or the like is used. In order to ensure the safety, the separator preferably has a shut-down function, that is, a function of closing voids at 80° C. or higher to increase the resistance and blocking the current, and the closing temperature is preferably 90° C. or higher and 180° C. or lower.

The shape of holes in the separator is generally a round shape or an elliptical shape, and the size of the holes in the separator is generally 0.05 µm to 30 µm and preferably 0.1 µm to 20 µm. Furthermore, the shape of the holes may be a rod shape or an irregular shape as in a case in which the separator is produced using a stretching method or a phase separation method. The ratio of these holes, that is, the porosity is 20% to 90% and preferably 35% to 80%.

A separator obtained from a porous polymer material may be a separator for which a single material such as cellulose non-woven fabric, polyethylene, or polypropylene is used or a separator for which two or more complexed materials are used. A separator obtained by laminating two or more fine-porous films having different hole diameters, porosities, hole closing temperatures, or the like is preferred.

As the inorganic material, oxides such as alumina and silicon dioxide, nitrides such as aluminum nitride and silicon nitride, and sulfates such as barium sulfate and calcium sulfate are preferred. An inorganic material having a particle shape or a fiber shape is used. As the form of a separator obtained from the inorganic material, a thin film shape of a non-woven fabric, a woven fabric, a fine-porous film, or the like is exemplified. As a separator having a thin film shape, a separator having a hole diameter of 0.01 µm to 1 µm and a thickness of 5 µm to 50 µm is preferably used. In addition to the above-described independent thin film shape, a separator obtained by forming a complex porous layer containing the particles of the above-described inorganic material on the surface layer of the positive electrode and/or the negative electrode using a resin binding agent can be used. For example, it is possible to form porous layers of alumina particles having a 90% particle diameter of less than 1 µm on both surfaces of the positive electrode using a fluorine resin binding agent, thereby forming a separator.

(Production of Non-Aqueous Secondary Battery)

As the shape of the non-aqueous secondary battery of the present invention, any form of a sheet shape, a bottomed square shape, a bottomed tubular shape (cylinder shape), and the like can be applied. The dispersion (mixture) including the positive electrode active material or the negative electrode active material is mainly used by being applied (coated), dried, and compressed on the collector.

Figure 2:
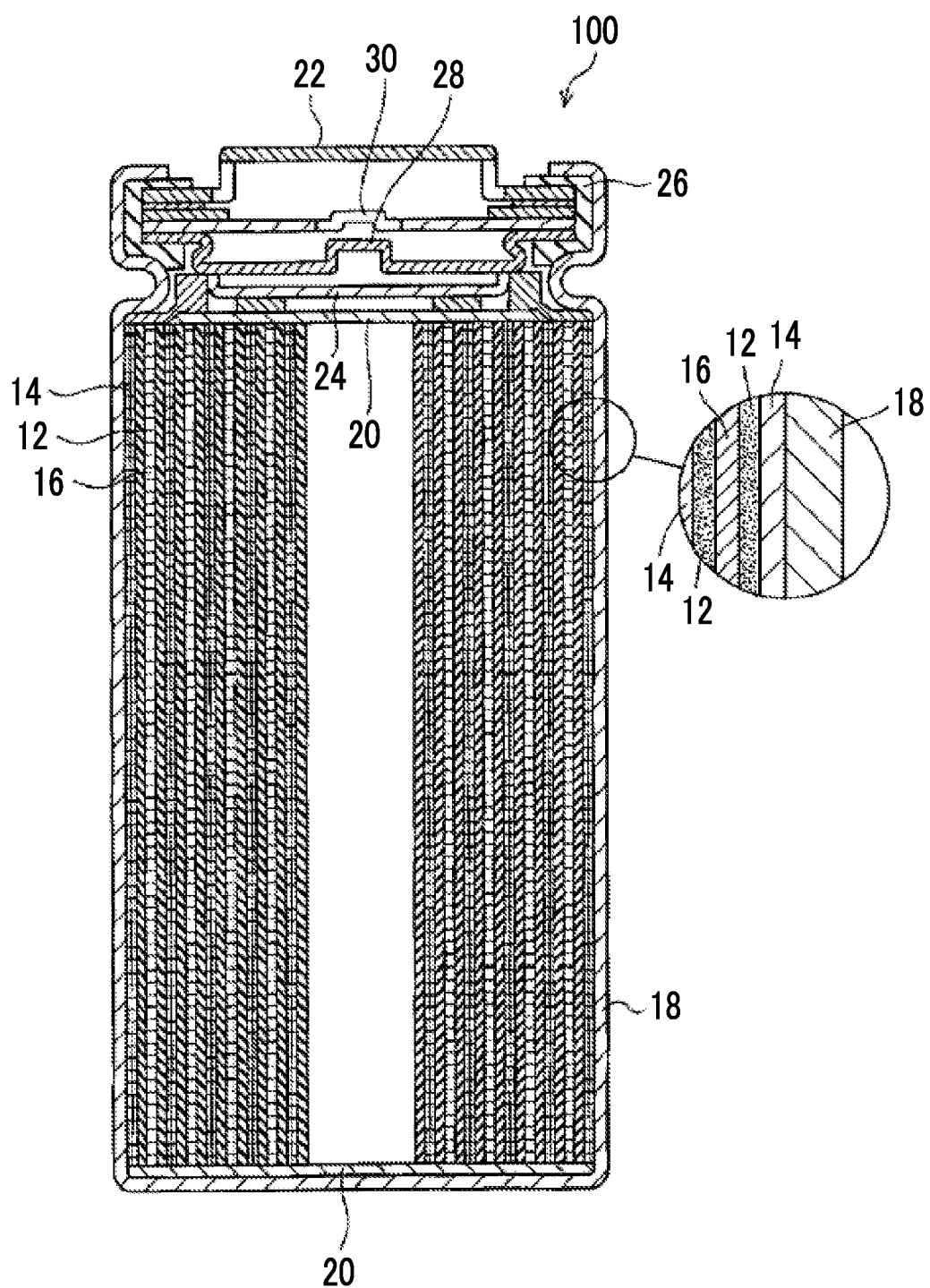
FIG. 2 is a cross-sectional view showing a specific constitution of the lithium ion non-aqueous secondary battery according to the preferred embodiment of the present invention.

Hereinafter, the constitution and the production method of a bottomed tubular-shaped lithium ion non-aqueous secondary battery 100 will be described as an example using FIG. 2. In a battery having a bottomed tubular shape, the outer surface area thereof relative to a power generation element into which the battery is loaded decreases, and thus it is preferable to provide a design in which Joule heat generated by an internal resistance during charge or discharge efficiently escapes to the outside. In addition, it is preferable to provide a design in which the loading ratio of a substance having a high thermal conduction property is increased and a temperature distribution in the battery becomes small. The bottomed tubular-shaped lithium ion non-aqueous secondary battery 100 is constituted by winding a positive electrode sheet 14 and a negative electrode sheet 16 that are laminated together through a separator 12 and storing the laminate in an exterior can 18. Additionally, a reference sign 20 represents an insulation plate, a reference sign 22 represents an opening-sealing plate, a reference sign 24 represents a positive electrode collector, a reference sign 26 represents a gasket, a reference sign 28 represents a pressure-sensitive valve body, and a reference sign 30 represents a current-blocking element. Meanwhile, in the enlarged circular drawing, the respective members are indicated using different hatchings in consideration of the visibility, but correspond to those in the overall drawing by the reference signs.

As a preferred method for producing the non-aqueous secondary battery, first, the negative electrode active material and a substance obtained by dissolving the binding agent, the filler, and the like, which are used as desired, in the organic solvent are mixed together, thereby preparing a slurry-form or paste-form negative electrode mixture. The obtained negative electrode mixture is uniformly and fully applied onto both surfaces of a metal core body as the collector, and then the organic solvent is removed, thereby forming a negative electrode active material layer. Furthermore, the laminate (mixture) of the collector and the negative electrode active material layer is rolled using a roll press machine or the like so as to adjust the thickness to a predetermined thickness, thereby obtaining a negative electrode sheet (electrode sheet). A positive electrode sheet can also be obtained using the same method as for the negative electrode. At this time, a method for applying the respective agents, a method for drying applied substances, and a method for forming electrodes of the positive electrode and the negative electrode may be according to ordinary methods.

In the present embodiment, a non-aqueous secondary battery having a tubular shape has been described as an example, but the non-aqueous secondary battery of the present invention is not limited thereto, and, for example, a square battery may be formed by laminating the electrode sheets for the positive electrode and the negative electrode, which are produced using the above-described method, together through a separator so that the active material layers face each other and then processing the laminate to a sheet-like shaped battery or folding the electrode sheets, then, inserting the electrode sheets into a square exterior can, electrically connecting the exterior can and the sheets, then, injecting an electrolytic solution thereinto, and sealing an opening portion using an opening-sealing plate.

In any of the embodiments, a safety valve can be used as the opening-sealing plate for sealing the opening portion. In addition, to an opening-sealing member, a variety of safety elements known in the related art as well as the safety valve may be attached. For example, as an overcurrent prevention element, a fuse, a bimetal, a positive temperature coefficient (PTC) element, or the like is preferably used.

Additionally, in addition to the safety valve, as a measure to an increase in the internal pressure of the exterior can (battery can), it is possible to use a method of providing an incision in the exterior can, a gasket cracking method, an opening-sealing plate-cracking method, or a method of cutting a lead plate and the exterior can. In addition, a charger may be equipped with a protective circuit into which an overcharge and/or overdischarge measure has been combined or be independently connected.

For the exterior can or the lead plate, it is possible to use a metal or an alloy having an electrical conductivity. For example, metals such as iron, nickel, titanium, chromium, molybdenum, copper, and aluminum and alloys thereof are preferably used.

As a method for welding a cap, the exterior can, the sheet, and the lead plate, an ordinary method (for example, direct-current or alternating-current electric welding, laser welding, or ultrasonic welding) can be used. As a sealing agent for sealing the opening, an ordinarily-used compound or mixture such as asphalt can be used.

(Initialization)

The non-aqueous secondary battery of the present invention manufactured as described above is initialized after the manufacturing or before the use, thereby forming a positive electrode SEI coating on the positive electrode surface. The initialization is not particularly limited, and, for example, the non-aqueous secondary battery can be initialized by carrying out 0.2 C constant-current charge until the battery voltage reaches 4.9 V and then carrying out 1 C constant-current discharge until the battery voltage reaches 2.75 V. The initialization can be carried out by repeating the above-described charge and discharge approximately three times.

[Use of Non-Aqueous Secondary Battery]

The non-aqueous secondary battery of the present invention suppresses the deterioration of the electrolytic solution for a non-aqueous secondary battery even in the case of being driven at a high potential and is thus applied to a variety of uses. Particularly, the non-aqueous secondary battery is preferably applied to applications for which high-potential driving is demanded. For electric vehicles and the like, a use in which a high-capacity secondary battery is mounted and charged everyday at home is assumed. In addition, the battery is driven with a high output, and thus a high battery voltage is required, and it becomes important to increase the battery voltage per battery in order to decrease the number of batteries. According to the present invention, it is possible to preferably deal with the above-described use form and exhibit the excellent effect.

The application form is not particularly limited, and examples thereof include, in a case in which the non-aqueous secondary battery is mounted in an electronic device, notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer uses include transportation devices such as cars and electric vehicles, motors, lighting equipment, toys, game devices, road conditioners, watches, strobes, cameras, medical devices (pacemakers, hearing aids, shoulder massage devices, and the like), and the like. Furthermore, the non-aqueous secondary battery can be used for a variety of military uses and universe uses. In addition, the non-aqueous secondary battery can also be combined with a solar battery.

A metal ion that is used to transport charges in the secondary battery is not particularly limited, but metal ions belonging to Group I or II of the periodic table are preferably used. Among them, a lithium ion, a sodium ion, a magnesium ion, a calcium ion, and the like are preferably used. Regarding the general technical matters of a secondary battery for which a lithium ion is used, a number of documents and publications including the patent documents described at the front serve as references. Additionally, regarding a secondary battery for which a sodium ion is used, it is possible to refer to Journal of Electrochemical Society; Electrochemical Science and Technology, USA, 1980, Vol. 127, pp. 2,097 to 2,099 and the like. Regarding a magnesium ion, it is possible to refer to Nature 407, pp. 724 to 727 (2000) and the like. Regarding a calcium ion, it is possible to refer to J. Electrochem. Soc. Vol. 138, 3536 (1991) and the like. The electrolytic solution of the present invention is preferably applied to a lithium ion non-aqueous secondary battery, but also exhibits a desired effect even in non-aqueous secondary batteries other than the lithium ion non-aqueous secondary battery, and thus the electrolytic solution is not interpreted to be limited thereto.

EXAMPLES

Hereinafter, the present invention will be described in more detail on the basis of examples. However, the present invention is not limited thereto.

Example 1

(Synthesis Examples of Compound Represented by any of General Formulae (I) to (III))

(1) Synthesis of Exemplary Compound A-1

The above-described exemplary compound A-1 was synthesized using the method described in Journal of Organometallic Chemistry (published in 1993, Volume 456, pp. 205 to 212).

(2) Syntheses of Exemplary Compounds A-2 to 11 and Compounds AR-1 and 2

The above-described exemplary compounds A-2 to 11 and compounds AR-1 and 2 described below were synthesized in the same manner as the exemplary compound A-1.

The exemplary compounds A-1 to 11 are the compound represented by any of General Formulae (I) to (III), and the compounds AR-1 and 2 are compounds for comparison. Meanwhile, the exemplary compounds AR-1 and AR-2 respectively correspond to I-18 and I-25 of JP2014-029827A. Hereinafter, the exemplary compounds A-1 to 11 and the compounds AR-1 and 2 will be referred to as the additives.

In the following formulae, TMS represents trimethylsilyl.

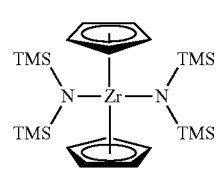

AR-1

-continued

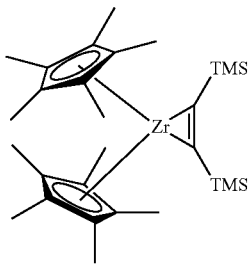

AR-2

(Preparation of Electrolytic Solution for Non-Aqueous Secondary Battery)

An ethylene carbonate/ethyl methyl carbonate (volume ratio=1:2) solution of 1 M LiPF$_6$ was added to the additives, adjustment was made so that the contents of the additives reached 0.1% by mass, thereby obtaining electrolytic solutions No. 101 to 111 and C12 and C13 shown in Table 1 below. Meanwhile, the electrolytic solution C11 was prepared in the same manner as described above except for the additive was not added thereto.

<Test>

For the electrolytic solutions of No. 101 to 111 and C11 to C13, $P_{OX}$ [%] (amount of electrolytic solution oxidized) was computed using a three-pole cell.

A positive electrode that was used in the three-pole cell was produced using a mixture having the following composition and aluminum as a collector. Hereinafter, positive electrodes produced in the above-described manner will be referred to as the LNMO positive electrode.

| | |
|---|---|
| Positive electrode active material: Lithium nickel manganate (LiNi$_{0.5}$Mn$_{1.5}$O$_4$) | 85% by mass |
| Conductive auxiliary agent: Carbon black | 7% by mass |
| Binding agent: Polyvinylidene fluoride (PVDF) | 8% by mass |

Figure 4:
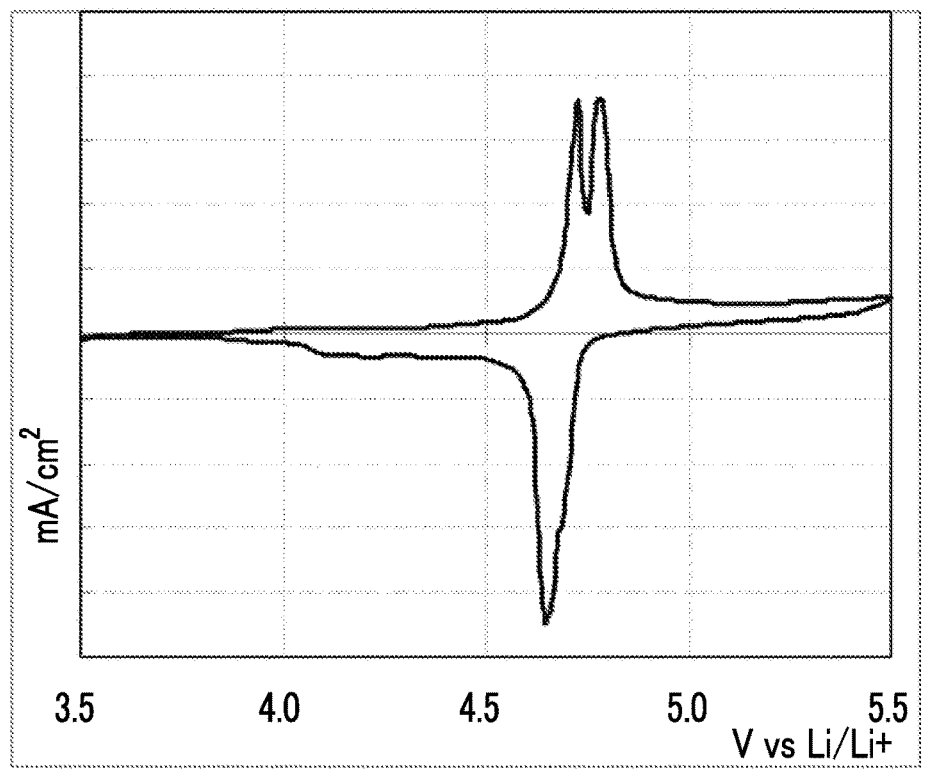
FIG. 4 is a cyclic voltammogram of an electrolytic solution for a non-aqueous secondary battery No. 101. The vertical axis indicates the current amount, and the horizontal axis indicates the potential.
Figure 5:
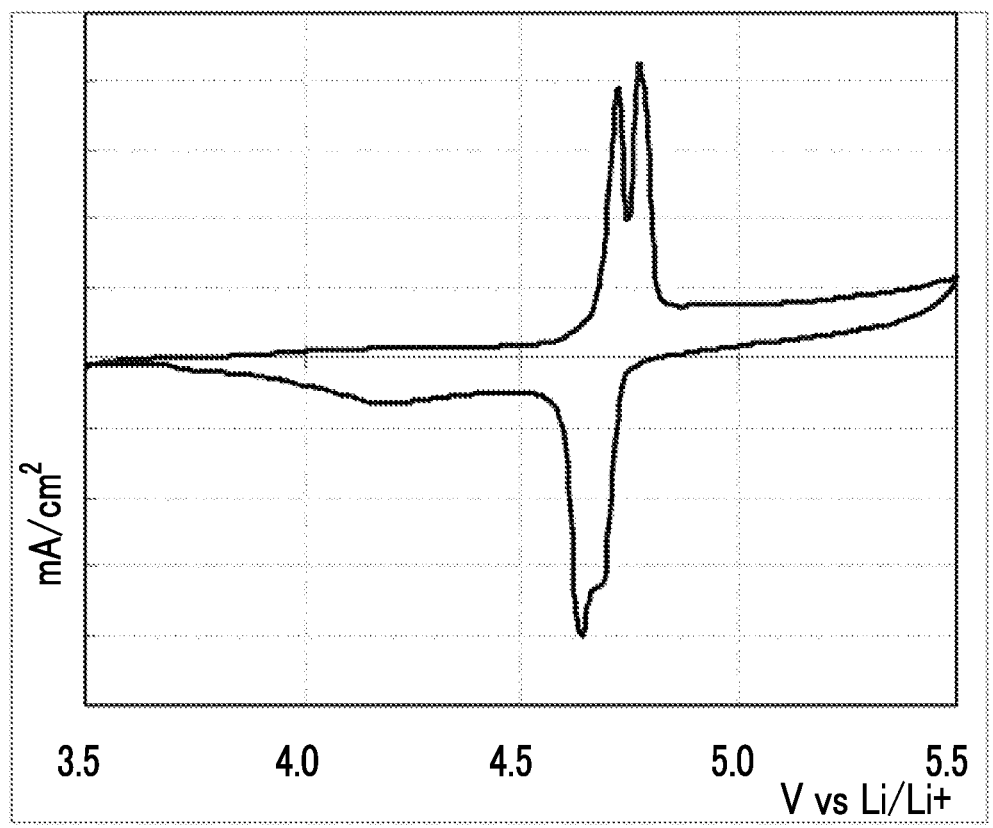
FIG. 5 is a cyclic voltammogram of an electrolytic solution for a non-aqueous secondary battery C11. The vertical axis indicates the current amount, and the horizontal axis indicates the potential.

A three-pole cell was constituted using the LNMO positive electrode as an action electrode and metallic Li as a reference electrode and a counter electrode respectively. The electrolytic solution obtained above was injected into the three-pole cell, and cyclic voltammetry measurement was carried out. Specifically, for each of the electrolytic solutions for a non-aqueous secondary battery, a total of four cycle potentials were swept under the following conditions, and a cyclic voltammogram of the fourth cycle was obtained. The cyclic voltammograms of No. 101 and C11 are shown in FIG. 4 and FIG. 5 respectively.

(Cyclic Voltammetry Measurement Conditions)

Three cycles (initialization) of sweeping was carried out at
Initial potential: 3.5 V
Peak potential: 5.2 V
Finish potential: 3.5 V
Sweeping rate: 0.1 mV/s, and then
one cycle of sweeping was carried out at
Initial potential: 3.5 V
Peak potential: 5.5 V
Finish potential: 3.5 V
Sweeping rate: 0.05 mV/s.

(Computation of Amount of Electrolytic Solution Oxidized $P_{OX}$ [%])

Figure 3:
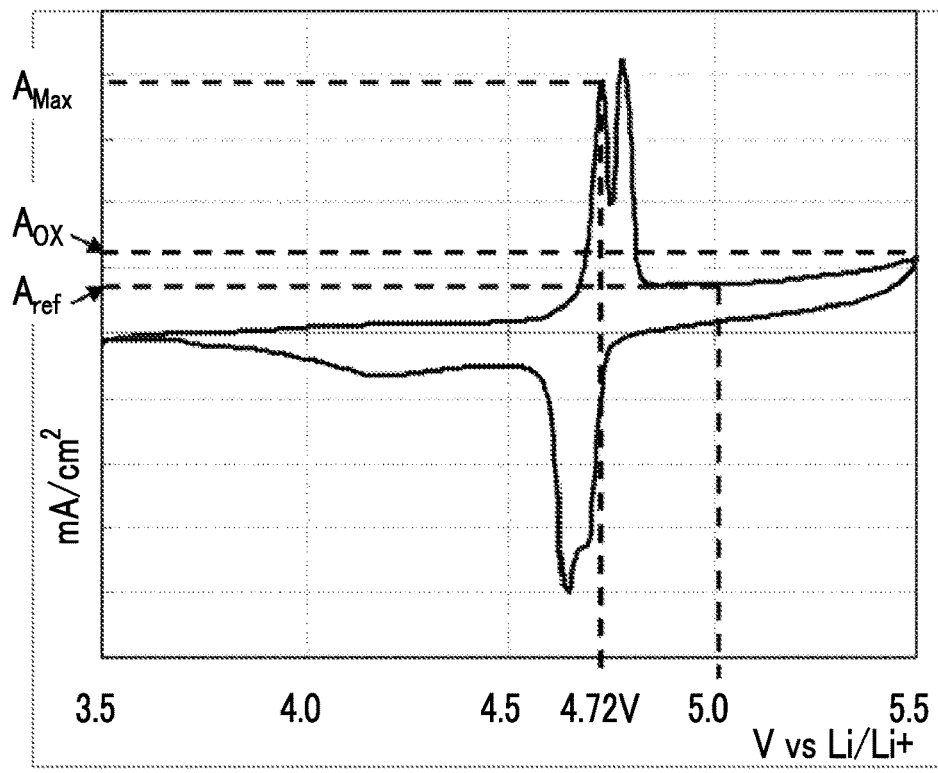
FIG. 3 is an explanatory view of cyclic voltammogram. The vertical axis indicates a current amount, and the horizontal axis indicates a potential.

$P_{OX}$ [%] was computed from the obtained cyclic voltammogram. Specifically, the oxidation current amount of a peak top on a low potential side near 4.7 V was represented by $A_{Max}$, the oxidation current amount at 5.0 V was represented by $A_{ref}$, and the oxidation current amount at 5.5 V was represented by $A_{OX}$ as shown in FIG. 3, and the amount of the electrolytic solution oxidized $P_{OX}$ [%] was computed from the following calculation expression. The obtained results are shown in Table 1.

$$P_{OX}[\%]=\{(A_{OX}-A_{ref})/A_{Max}\}\times 100$$

TABLE 1

| Electrolytic solution No. | Additive | Amount of electrolytic solution oxidized $P_{OX}$ [%] |
|---|---|---|
| 101 | A-1 | 2 |
| 102 | A-2 | 5 |
| 103 | A-3 | 3 |
| 104 | A-4 | 6 |
| 105 | A-5 | 5 |
| 106 | A-6 | 3 |
| 107 | A-7 | 2 |
| 108 | A-8 | 3 |
| 109 | A-9 | 3 |
| 110 | A-10 | 2 |
| 111 | A-11 | 5 |
| C11 | — | 10 |
| C12 | AR-1 | 8 |
| C13 | AR-2 | 8 |

<Notes of table>
"—" indicates that the additive is not contained.

The result of No. C11 shows that the electrolytic solution not containing the additive had an amount of the electrolytic solution oxidized of 10%. It is considered that, in the case of driving a non-aqueous secondary battery in which the above-described electrolytic solution is used at a high potential, the electrolytic solution easily oxidizes and deteriorates and the performance of the non-aqueous secondary battery which does not relate to the use degrades.

The results of No. 101 to 111, C12, and C13 show that, compared with the electrolytic solutions containing the additive for comparison, in all of the electrolytic solutions containing the compound (additive) represented by any of General Formula (I) to (III), the amount of the electrolytic solution oxidized decreased by 25% or more compared with the amount of electrolytic solution oxidized of C12. For example, in a case in which, in a battery, the degree of the deterioration of the charge and discharge efficiency is improved by 25%, the battery service life improves 1.3 times. Therefore, in a case in which this electrolytic solution is used in a non-aqueous secondary battery, in principle, it is possible to expect the improvement of the capacity retention and preservation property of the battery and the improvement of swollenness.

Example 2

The amount of the electrolytic solution oxidized was evaluated in a case in which a positive electrode different from that in Example 1 was used in the electrolytic solution prepared in Example 1.

Specifically, $P_{OX}$ [%] was computed in the same manner as in Example 1 except for the fact that lithium nickel manganate that was used as the positive electrode active material in Example 1 was changed to olivine-type lithium cobalt phosphate (LiCoPO$_4$).

For the obtained amount of the electrolytic solution oxidized, a relative value in the case of considering the amount of the electrolytic solution oxidized ($P_{OX}$ [%]) of C11 as 100 was obtained and evaluated using the following standards. The obtained results are shown in Table 2.

—Evaluation Standards—
A: 0 or more and less than 30
B: 30 or more and less than 60
C: 60 or more and less than 80
D: 80 or more and 100 or less

TABLE 2

| Electrolytic solution No. | Additive | Amount of electrolytic solution oxidized |
|---|---|---|
| 101 | A-1 | A |
| 102 | A-2 | B |
| 103 | A-3 | A |
| 104 | A-4 | B |
| 105 | A-5 | B |
| 106 | A-6 | A |
| 107 | A-7 | A |
| 108 | A-8 | A |
| 109 | A-9 | A |
| 110 | A-10 | A |
| 111 | A-11 | B |
| C11 | — | D |
| C12 | AR-1 | C |
| C13 | AR-2 | C |

As is clear from Table 2, for the electrolytic solutions No. 101 to 111 which contained the compound (additive) represented by any of General Formulae (I) to (III), the electrolytic solution of C11 not including the additive, and the electrolytic solutions of C12 and C13 containing the additive for comparison, the same results as in Example 1 were obtained even in the case of changing the positive electrode active material to olivine-type lithium cobalt phosphate.

The present invention has been described together with the embodiment thereof; however, unless particularly otherwise specified, the present inventors did not mean to limit our invention to any detailed parts of the description, and consider that the present invention should be broadly interpreted within the concept and scope of the present invention specified in the accompanying claims.

The present application claims priority on the basis of JP2016-142519 filed on Jul. 20, 2016 in Japan, the content of which is incorporated herein as a part of the description of the present specification by reference.

EXPLANATION OF REFERENCES

C: positive electrode (positive electrode mixture)
1: positive electrode conductive material (collector)
2: positive electrode active material layer
A: negative electrode (negative electrode mixture)
3: negative electrode conductive material (collector)
4: negative electrode active material layer
5: electrolytic solution for non-aqueous secondary battery
6: operation mechanism
7: circuit wire
9: separator
10: lithium ion non-aqueous secondary battery
12: separator
14: positive electrode sheet
16: negative electrode sheet
18: exterior can also serving as negative electrode collector
20: insulation plate
22: opening-sealing plate
24: positive electrode collector
26: gasket
28: pressure-sensitive valve body
30: current-blocking element
100: bottomed tubular-shaped lithium ion non-aqueous secondary battery

What is claimed is:

1. An electrolytic solution for a non-aqueous secondary battery comprising:
an electrolyte;
an organic solvent; and
a compound represented by any of General Formulae (I) to (III),

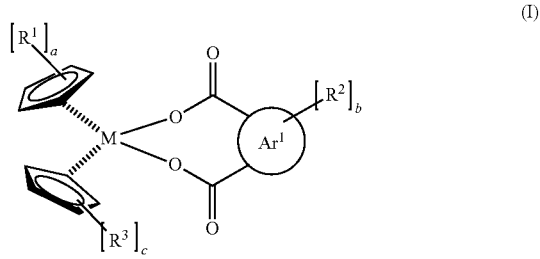

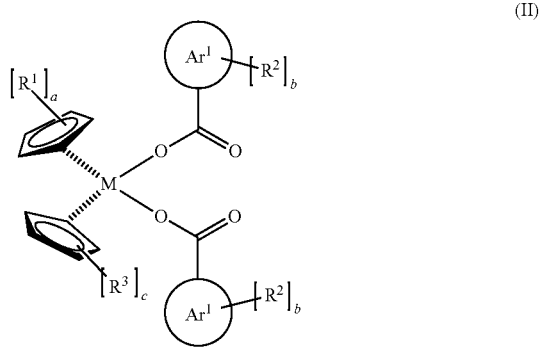

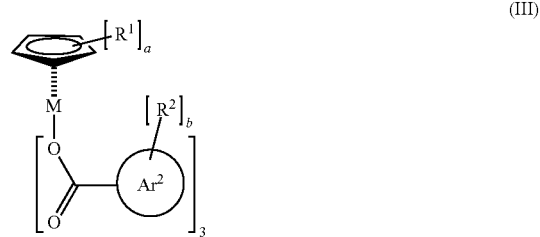

in the formulae, M represents a transition metal,
$R^1$, $R^2$, and $R^3$ each independently represent an alkyl group, an alkylsilyl group, an alkenyl group, an alkynyl group, an alkoxy group, a thioalkoxy group, an amino group, an amide group, an acyloxy group, a cyano group, a carboxy group, a carbonyl group-containing group, a sulfonyl group-containing group, a phosphino group, or a halogen atom, a represents an integer of 0 to 5, b represents an integer of 0 or more, c represents an integer of 0 to 5,
$Ar^1$ represents an aromatic ring, and, in General Formula (II), a plurality of $Ar^1$'s may be linked together, and
$Ar^2$ represents a nitrogen-containing aromatic hetero ring.

2. The electrolytic solution for a non-aqueous secondary battery according to claim 1,
wherein, in General Formulae (I) to (III), M is Ti, Zr, or Hf.

3. The electrolytic solution for a non-aqueous secondary battery according to claim 1,
wherein a compound having a carbonate group is included as the organic solvent.

4. A non-aqueous secondary battery comprising:
a positive electrode;
a negative electrode; and
the electrolytic solution for a non-aqueous secondary battery according to claim 1.

* * * * *